(12) United States Patent
Kim

(10) Patent No.: US 6,246,209 B1
(45) Date of Patent: Jun. 12, 2001

(54) CONTROL DEVICE FOR ALTERNATING CURRENT MOTOR

(75) Inventor: Han Jong Kim, Changwon (KR)

(73) Assignee: LG Industrial Systems Co., Ltd., Seoul (KR)

( * ) Notice: Subject to any disclaimer, the term of this patent is extended or adjusted under 35 U.S.C. 154(b) by 0 days.

(21) Appl. No.: 09/413,864

(22) Filed: Oct. 7, 1999

(30) Foreign Application Priority Data

Oct. 7, 1998 (KR) .................................................. 98-41822

(51) Int. Cl.[7] .............................. H02P 5/28; H02P 5/34; H02P 5/408; H02P 7/36; H02P 7/44
(52) U.S. Cl. ........................ 318/811; 318/808; 318/812; 318/815; 363/41; 363/91; 307/416
(58) Field of Search ........................... 318/811, 808, 318/812, 814, 815, 813, 804; 363/41, 91; 307/415, 419, 416

(56) References Cited

U.S. PATENT DOCUMENTS

| | | | |
|---|---|---|---|
| 609,991 | * | 8/1898 | Lamme ................................ 318/811 |
| 3,659,184 | * | 4/1972 | Schwarz ................................ 321/2 |
| 4,055,740 | * | 10/1977 | Nakamura et al. ........... 219/10.49 R |
| 4,424,459 | * | 1/1984 | Inomata et al. ...................... 307/415 |
| 4,445,167 | * | 4/1984 | Okado ................................... 363/56 |
| 5,045,989 | * | 9/1991 | Higaki et al. ......................... 363/37 |
| 5,298,848 | * | 3/1994 | Ueda et al. .......................... 318/811 |
| 5,773,944 | * | 6/1998 | Courault .............................. 318/432 |
| 5,852,554 | * | 12/1998 | Yamamoto ............................ 363/71 |
| 6,015,964 | * | 1/2000 | Baker ............................ 219/130.33 |
| 6,028,405 | * | 2/2000 | Kume et al. ......................... 318/254 |
| 6,141,227 | * | 10/2000 | Sheikh et al. ........................ 363/41 |

* cited by examiner

Primary Examiner—Robert E. Nappi
Assistant Examiner—Edgardo San Martin

(57) ABSTRACT

The present invention relates to a control of an AC motor, and in particular to a control device for an AC motor which can prevent an overvoltage from being applied to the motor, and minimize voltage consumption of a reactor itself during the starting and accelerating operation of the motor, by restricting a sharp increase of a motor line voltage resulting from a high-speed switching of an inverter during a high-speed operation of the motor, and a voltage reflection phenomenon of input terminals of the motor generated due to non-matching of a characteristic impedance between a power line and the motor, by inserting the reactor having a bar shaped core between the inverter and the motor.

5 Claims, 7 Drawing Sheets

CONTROL DEVICE FOR ALTERNATING CURRENT MOTOR

BACKGROUND OF THE INVENTION

1. Field of the Invention

The present invention relates to a control of an AC(Alternating Current) motor, and in particular to a control device for an AC motor which can prevent an overvoltage from being applied to the motor by minimizing power consumption of a reactor during a starting or accelerating operation of the motor, and by restricting a sharp increase of a motor line voltage resulting from a high-speed switching of an inverter during a high-speed operation of the motor, and a voltage reflection phenomenon of input terminals of the motor generated due to non-matching of a characteristic impedance between a power line and the motor, by inserting the reactor having a bar shaped core between the inverter and the motor.

2. Description of the Background Art

A PWM (Pulse Width Modulation) control method has been generally used for controlling an AC motor. The PWM control method has many advantages in controlling a switching of a power switching device used for an inverter. However, a voltage applied to the motor is sharply increased due to a voltage variation rate dV/dt resulting from a high-speed switching. Thus as a disadvantageous overvoltage is applied to the motor, so that insulating, over heating and EMI (Electromagnetic Interference) may be generated in the motor.

The causes of insulating and heating in the PWM control method can be organized into two categories. One is insulating and heating generated by a sharp increase of a line voltage due to a high-speed switching of the power switching device, and a voltage reflection phenomenon of input terminals of the motor resulting from non-matching of a characteristic impedance between a power line and the motor. The other is insulating and heating caused by a voltage (hereinafter, referred to as 'common mode voltage') generated between a motor frame and a coil due to an instant voltage unbalance in the PWM control operation.

Here, the motor line voltage is considerably influenced by the insulating and heating resulting from the voltage reflection phenomenon of the line voltage. In order to overcome this disadvantage, there has been used a method of restricting a rapid increase of an output voltage of the inverter by providing a closed type line reactor and an LRC (Coil Resistor Capacitor) filter between an output terminal of the PWM inverter and the motor.

FIG. 1 is a block diagram illustrating a conventional control device for a three phase AC motor. As shown therein, an alternating current three phase power source 1 is rectified by a converter 2 via booster reactors/inductors $L_R$, $L_S$, $L_T$ for each phase, and smoothed by smoothing condensers/capacitors C1, C2. Accordingly, a converted direct current voltage is applied to an inverter 3. The inverter 3 converts the direct current voltage into a three phase alternating current voltage of a variable frequency, namely an U, V and W phase alternating current voltage, and outputs it under the control of a pulse width modulation signal generator 5. The three phase U, V, W alternating current voltage is supplied to a motor 7 via the closed type line reactor 6 and a power line PL. The inverter 3 includes a plurality of power transistors (not shown) for high-speed switching, for example, IGBT (Insulated Gate Bipolar Transistor). The pulse width modulation signal generator 5 outputs a pulse width modulation signal to the power transistors of the inverter 3, and the controller 4 controls the pulse width modulation signal generator 5.

FIGS. 2A to 2D illustrate structures of the conventional closed type line reactor 6. FIG. 2A shows a single phase closed type line reactor. As shown therein, a narrow clearance or gap is formed at a core of the closed type line reactor. When a current or voltage is transmitted from the inverter 3 through the coil, a magnetic flux is formed in a clockwise or counterclockwise direction through the core. A pattern of the magnetic flux is varied according to whether a frequency of the voltage and current outputted from the inverter is high or low. In general, the low frequency is below 100 kHz, and the high frequency is over 100 kHz. FIG. 2B shows a pattern of the magnetic flux in the case that the current supplied to the single phase closed type reactor is a low frequency. As shown therein, the magnetic flux generated by the low frequency current flows through the core and the clearance. That is, a closed circuit of the magnetic flux includes the clearance. To the contrary, FIG. 2C shows a pattern of the magnetic flux when the current supplied to the single phase closed type line reactor is a high frequency. As shown therein, the magnetic flux generated by the high frequency current is mostly leaked from the portion wound with the coil, and thus does not pass through the clearance. That is, the magnetic flux passing perpendicularly to a direction of an electric current is mostly a leaked magnetic flux. On the other hand, FIG. 2D shows a three phase closed type line reactor.

FIG. 3 illustrates an equivalent circuit to FIG. 1. As depicted therein, the closed type line reactor 6 is represented by a serial connection of an inductance $L_L$, and a resistance $R_L$. The power line $P_L$ is represented by a serial connection of an inductance $L_P$ and a capacitance $C_P$, and the motor 7 is represented by a serial connection of a capacitance $C_M$ and a resistance $R_M$.

As shown in the equivalent circuit diagram of FIG. 3, the closed type line reactor 6 having the inductance $L_L$ and the resistance $R_L$ is provided to the power line PL having the inductance $L_P$ and the capacitance $C_P$, and thus the closed type line reactor 6 and the power line PL serve as an LRC series circuit. Here, the inductance $L_L$ of the closed type line reactor 6 and the capacitance $C_M$ of the motor 7 become parameters for deciding a rising time of the line voltage, and the resistance $R_L$ of the closed type line reactor 6 becomes a parameter for deciding a maximal value of the line voltage.

As described above, the inductance $L_L$ element of the closed type line reactor 6 is added to the power line PL, thereby reducing the voltage reflection phenomenon resulting from the increase of the rising time of the voltage, namely controlling a rising of the output voltage from the inverter 3. In addition, the resistance $R_L$ element of the closed type line reactor 6 is added to the power line PL, and thus performs a damping operation. Accordingly, a maximum value of the line voltage may be decreased. As a result, when the closed type line reactor is designed by properly selecting the inductance $L_L$ and the resistance $R_L$, the rising of the output voltage from the inverter may be restricted, and the maximum value of the line voltage can be decreased.

However, the closed type line reactor 6 has the following disadvantages.

Firstly, in general, the impedance of the closed type line reactor is preferably approximately 3 to 5% of the impedance of the motor. The greater the impedance value of the closed type line reactor is, the more the restriction effect of the output voltage is increased. However, there is a limit to increase the impedance value. As the amount of current is increased, a cross sectional area of the closed type line reactor, namely a cross sectional area of the core must be increased, and thus a size and a weight thereof are also increased, which results in undesirable large size and high cost. Especially, when the motor is driven at a high frequency, the magnetic flux passes perpendicularly to the direction of the electric current merely at the portion wound with the coil in the closed type line reactor. Therefore, the other portions where the magnetic flux does not pass perpendicularly to the direction of the electric current are unnecessary.

Secondly, since the closed type line reactor must be connected to the motor in series, the output voltage of the inverter is decreased by the closed type line reactor. Accordingly, the inverter must supply a voltage consumed in the closed type line reactor, in addition to the voltage for driving the motor. Especially, the motor is operated by a high frequency alternating current when reaching to a rated speed. When the motor is operated by the high frequency alternating current, the voltage generated by the portions of the whole core where the coil is not wound is lost.

FIG. 4 depicts voltage and current characteristics of each unit when the motor is driven. As shown therein, a large amount of current $I_M$ flows in the motor during a starting and accelerating period T. The inverter must supply a voltage $V_M$ for driving the motor and a voltage $V_L$ consumed in the closed type line reactor, and thus an output voltage $V_I$ from the inverter must be increased. However, a maximum value of the inverter output voltage $V_I$ is determined by a DC link voltage. Accordingly, when driven by the rated voltage, if the motor is operated at a high speed or torque, a large amount of current flows. As a result, a voltage drop of the closed type line reactor is increased, and thus a voltage necessary to drive the whole system may be greater than the inverter output voltage. In this case, the motor may not be able to output a wanted output.

SUMMARY OF THE INVENTION

It is therefore a primary object of the present invention to provide a control device for an AC motor which can prevent insulating and heating resulting from a voltage reflection phenomenon of a motor line voltage when the motor is operated at a high speed.

It is another object of the present invention to improve system efficiency by reducing a voltage consumed in a reactor during a starting or accelerating operation of an AC motor, by providing the reactor which can pass a magnetic flux perpendicularly to a direction of an electric current at the whole core thereof.

It is still another object of the present invention to provide a control device for an AC motor which can minimize a system size by using a reactor having a small size.

In order to achieve the above-described objects of the present invention, there is provided a control device for an AC motor including: an alternating current power source for providing an alternating current to the AC motor; a converter for converting the alternating current supplied from the power source into a direct current; a condenser for smoothing the direct current outputted from the converter; an inverter for converting the direct current from the condenser into an alternating current, and having a plurality of power switching devices; a pulse width modulation signal generator for supplying a control signal to switch the power switching devices; a controller for controlling a generation of the control signal of the pulse width modulation signal generator; and a reactor provided between the inverter and the motor, for minimizing voltage consumption during a starting or accelerating operation of the motor, and having at least one bar shaped core for restricting application of an overvoltage to the motor during a high-speed operation of the motor.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 5:
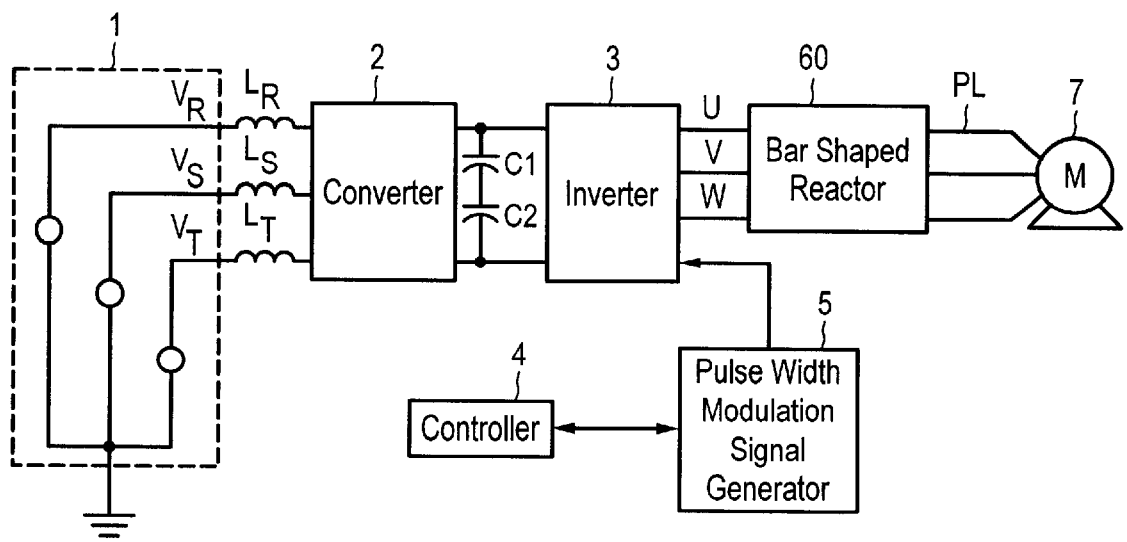
FIG. 5 is a block diagram illustrating a control device for a three phase AC motor in accordance with a preferred embodiment of the present invention.

FIG. 5 is a block diagram illustrating a control device for a three phase AC motor in accordance with a preferred embodiment of the present invention. As shown therein, the control device for the three phase AC motor includes: a converter 2 rectifying an alternating current three phase power 1; smoothing condensers C1, C2 smoothing the rectified voltage; an inverter 3 having a plurality of power transistors (not shown) for high-speed switching, receiving the smoothed direct current voltage, and converting it into an alternating current voltage; a motor 7 driven by the inverter 3; a reactor 60 having a bar shaped core connected between the inverter 3 and the motor 7 in series; a pulse width modulation signal generator 5 outputting a pulse width modulation signal for switching to the power transistors of the inverter 3; and a controller controlling the pulse width modulation signal generator 5.

Figure 6A:
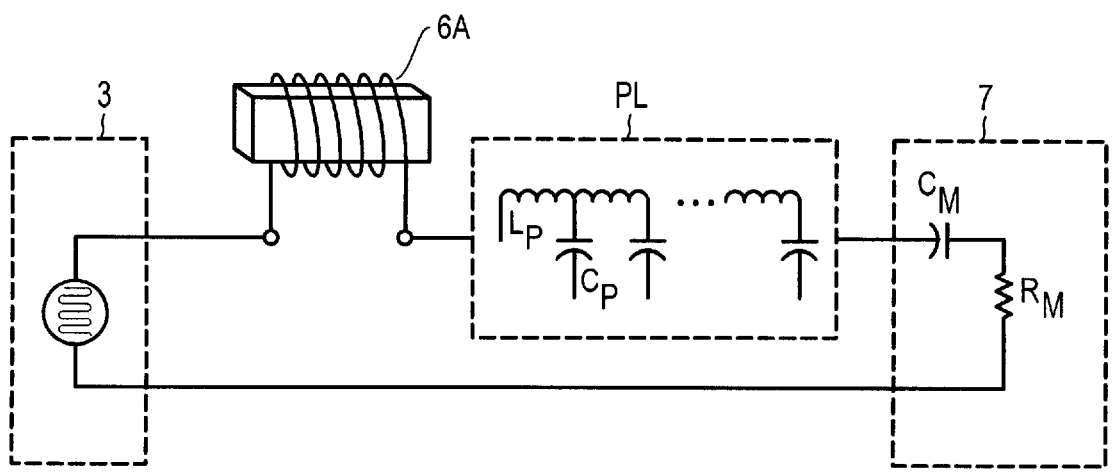
FIGS. 6A and 6B are equivalent circuit diagrams to FIG. 5.
Figure 6B:
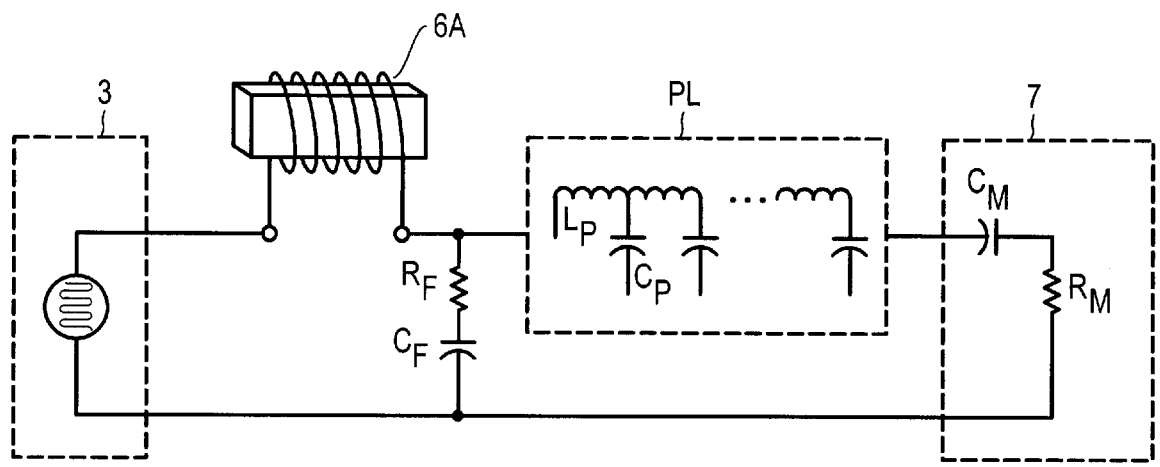

FIGS. 6A and 6B are equivalent circuit diagrams to FIG. 5. FIG. 6A shows a reactor 6A includes a bar shaped core wound with a coil, and FIG. 6B shows an embodiment that also includes a low pass filter by adding a resistance and a condenser/capacitor connected in series with the reactor in FIG. 6A. In FIG. 6B, a resistance Rf and a condenser Cf are connected in parallel with the series connected power line PL and the motor 7 to define a low pass filter connected. According to the embodiment of FIG. 6B, a frequency of an output voltage of the inverter is prevented from rising over a predetermined high frequency by the low pas filter. Accordingly, an overvoltage is not applied to the motor 7.

Figure 7A:
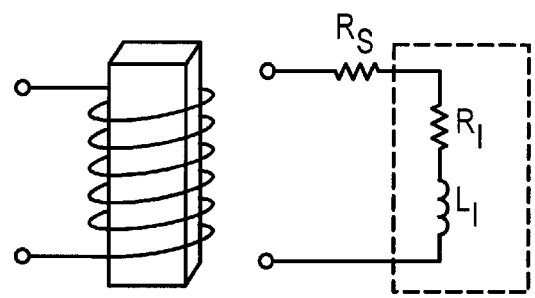
FIGS. 7A to 7E illustrate various embodiments of a reactor having a bar shaped core in accordance with the present invention.

FIG. 7A shows a structure of a single phase reactor and an equivalent circuit thereof in accordance with the present invention. As shown therein, a resistance Rs denotes a coil resistance, a resistance R1 denotes a core loss generated at the core, and 'Ll' denotes an inductance of the coil winding round the core, respectively.

Figure 1:
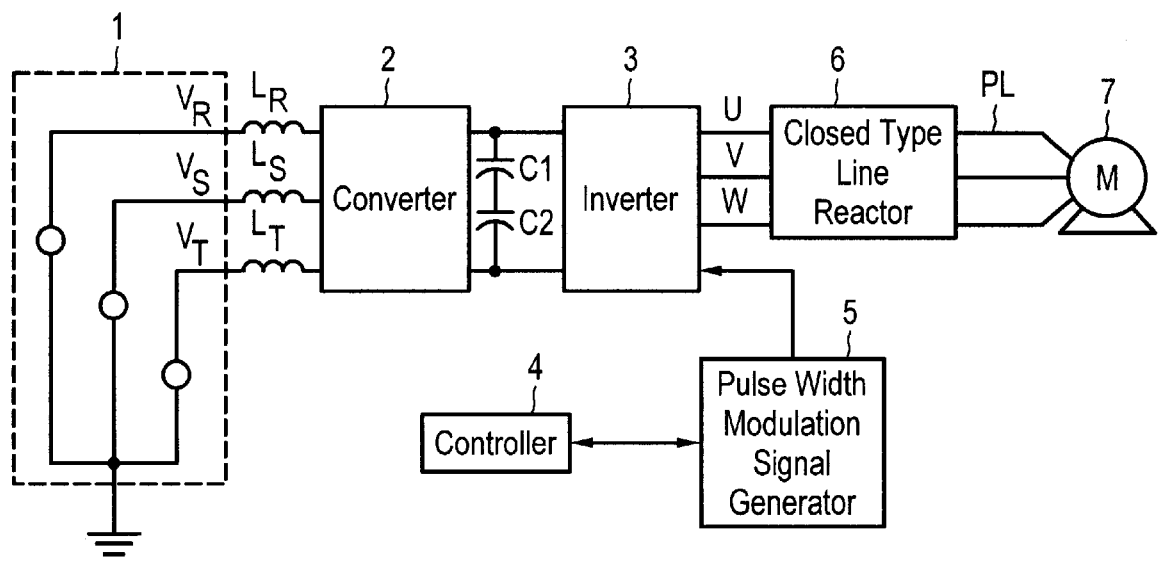
FIG. 1 is a block diagram illustrating a conventional control apparatus for a three phase AC motor.
Figure 2A:
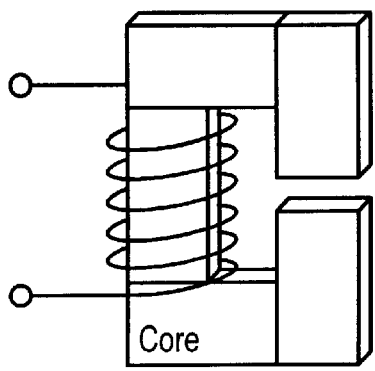
FIGS. 2A to 2D illustrate a structure of a conventional closed type line reactor.
Figure 2B:
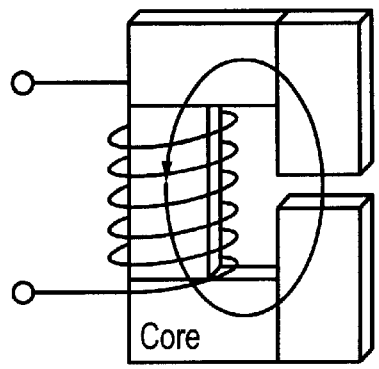
Figure 2C:
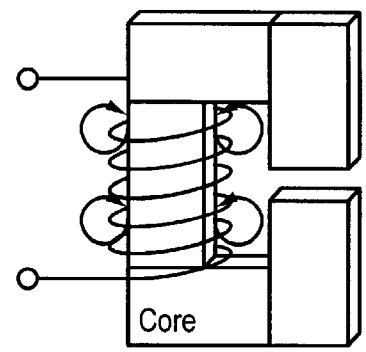
Figure 2D:
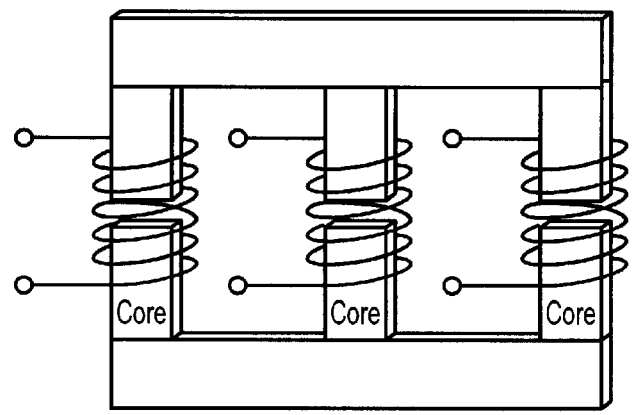
Figure 3:
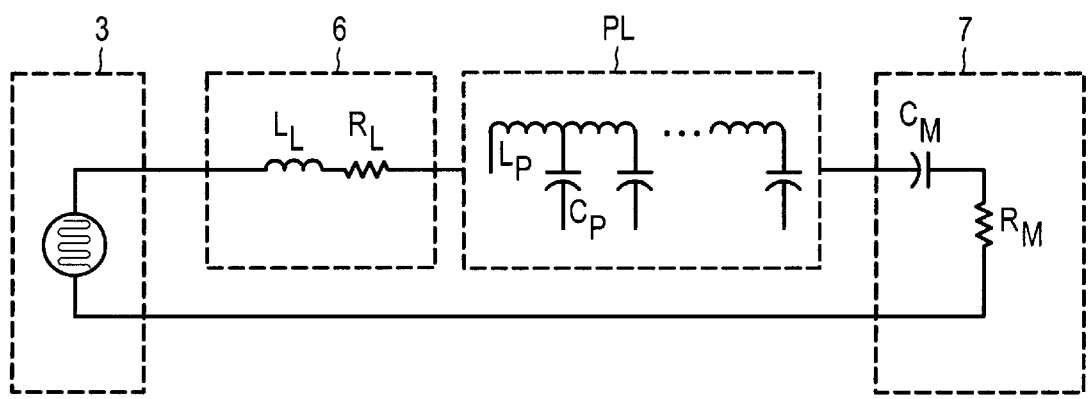
FIG. 3 is an equivalent circuit diagram to FIG. 1.
Figure 4:
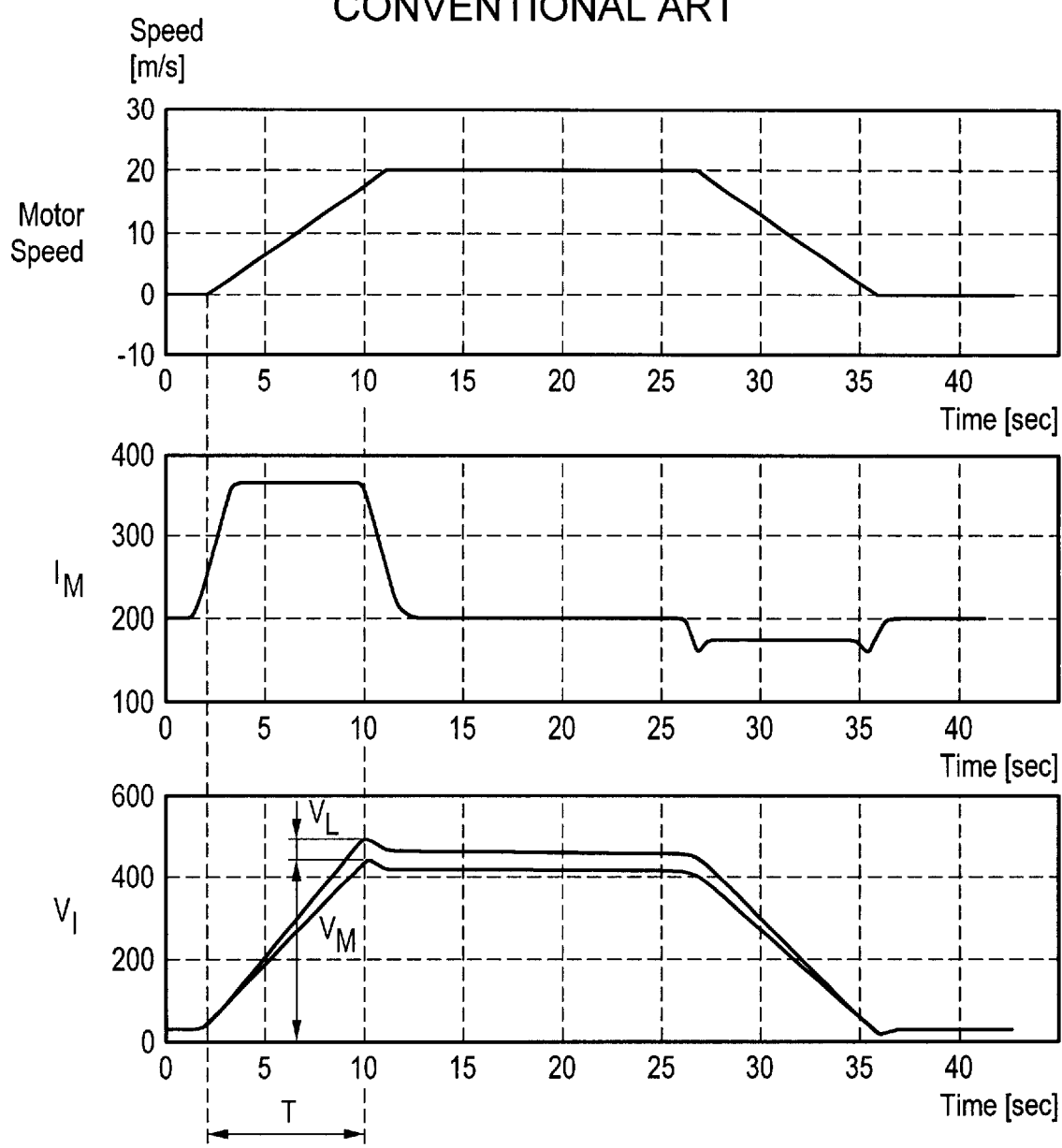
FIG. 4 is a waveform diagram illustrating a motor speed, a characteristic of a current flowing in the conventional motor, and a characteristic of an inverter output voltage in accordance with time when the conventional motor is controlled.
Figure 7B:
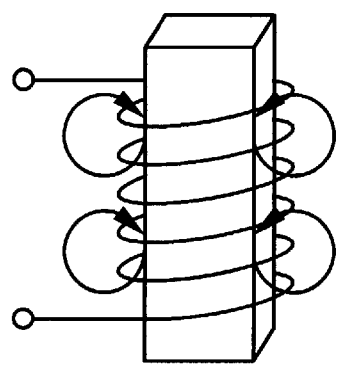

As compared with the conventional single phase closed type line reactor as shown in FIG. 2A, the structure of the single phase reactor as shown in FIG. 7A does not include the portion of the core which is not wound with the coil. The removed core portion is a portion which is not associated with a path of a magnetic flux when the inverter 3 is operated at a high frequency, namely a portion where the magnetic flux does not pass perpendicularly to a direction of an electric current. FIG. 7B shows a shape of the magnetic flux when the current supplied to the single phase reactor in accordance with the present invention is a high frequency. When it is presumed that a cross section of the bar shaped reactor core after being horizontally cut is identical to a cross section of the conventional closed type reactor core after being horizontally cut, a size of the reactor in accordance with the present invention is equal to or smaller than a half of a size of the conventional closed type reactor.

Figure 7C:
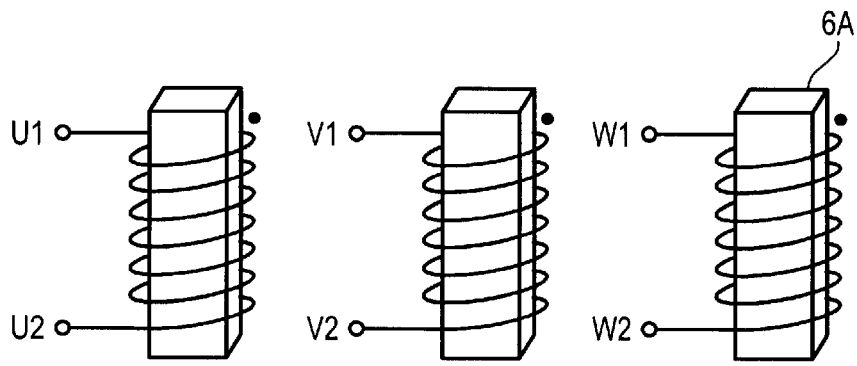
Figure 7D:
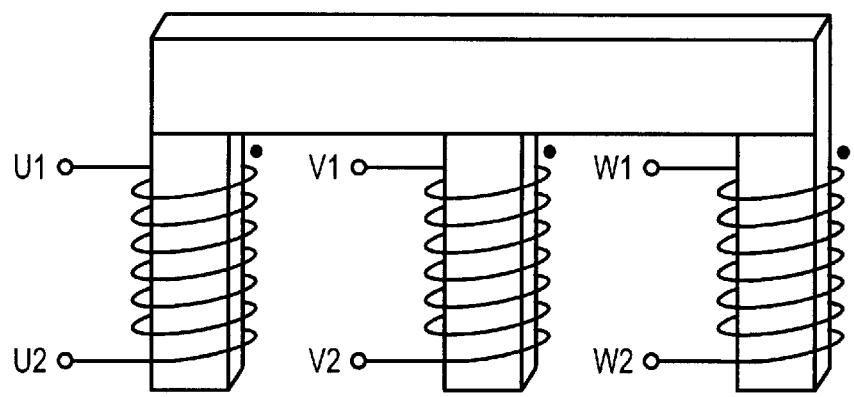
Figure 7E:
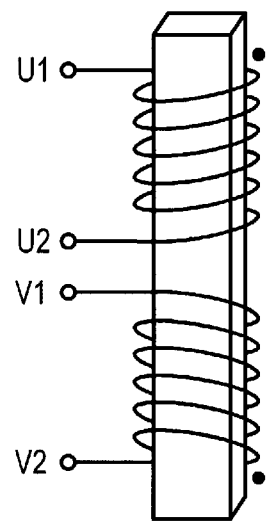

FIG. 7C illustrates a structure of the three phase reactor in accordance with the present invention. As depicted therein, the three phase reactor includes three single phase reactors. FIG. 7D illustrates a structure of a three phase reactor in accordance with the present invention formed by supporting the three single phase bar shaped reactors as shown in FIG. 7C on a steel supporting unit 10. The three phase reactor as shown in FIG. 7D has a larger inductance and resistance, as compared with the three phase bar shaped reactor as shown in FIG. 7C. FIG. 7E illustrates a structure of a two phase reactor including one bar shaped core wound with two phase coils.

On the other hand, although not illustrated, three phase coils may wind around the one bar shaped core as shown in FIG. 7E.

In general, in case the power transistors of the inverter are insulated gate bipolar transistors IGBT, a rising time of the line voltage is approximately from 50 to 200 nsec (nano second). When the rising time of the line voltage is presumed to be 100 nsec, the frequencies of the voltage and current of the motor 7 corresponding to the rising time are approximately from 100 kHz to 10 MHz. That is, after the motor 7 is started, when an output frequency of the inverter 3 is gradually increased for acceleration, and thus exceeds 100 nsec, namely when the motor 7 is operated at a constant speed after a transition period of the starting and accelerating operations, the frequency of the line voltage of the motor 7 reaches to an operational frequency (500 kHz–1 MHz).

Figure 8A:
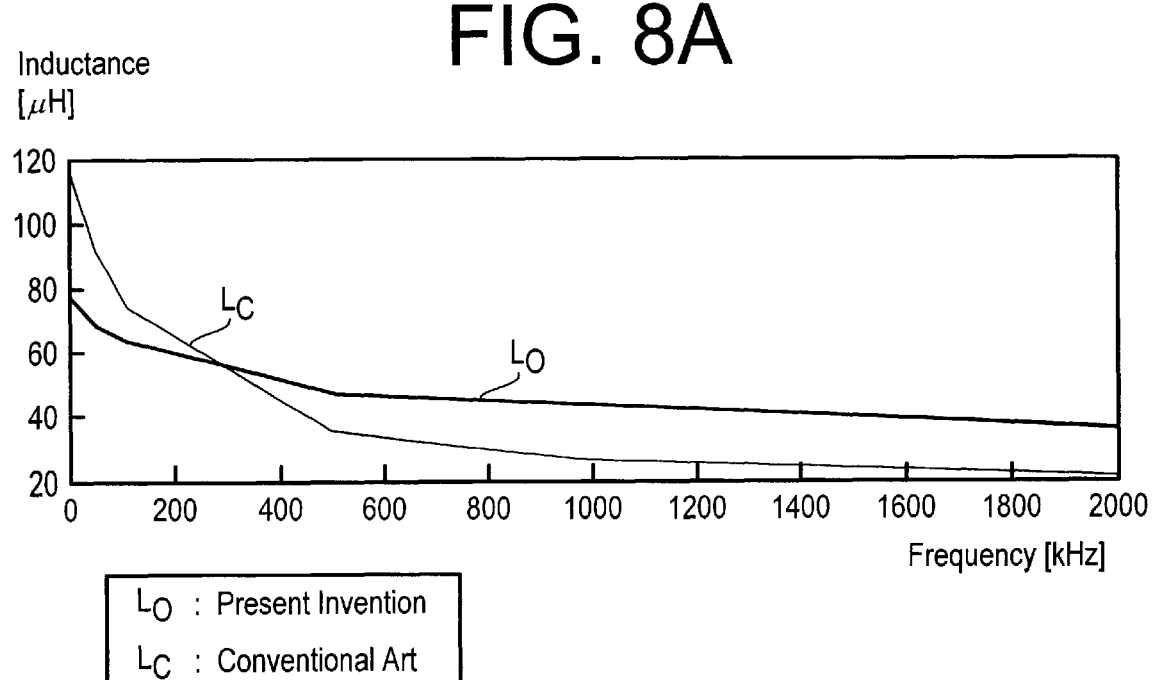
FIGS. 8A and 8B are a waveform diagrams for comparing resistance and inductance values of the reactors in accordance with an alternating current output frequency of the inverters in the conventional art and the present invention.
Figure 8B:
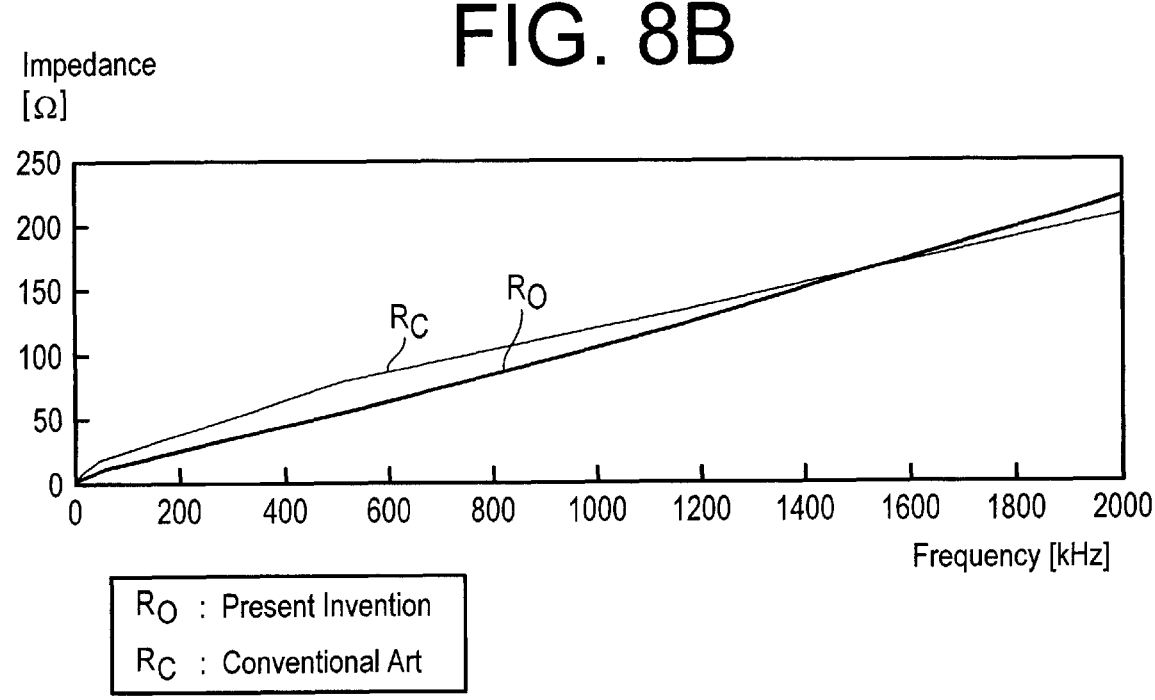

FIG. 8A and 8B illustrate a comparison result of an inductance Lo and a resistance Ro of the open type reactor in accordance with the present invention and an inductance Lc and a resistance Rc of the conventional closed type reactor. As shown therein, at a low frequency, the inductance Lc of the conventional closed type reactor is greater than the inductance L1 of the open type reactor in accordance with the present invention, and at a high frequency, the inductance L1 of the open type reactor in accordance with the present invention is greater than the inductance Lc of the conventional closed type reactor. On the other hand, the inductance Lo and the inductance Lc are similar at the frequency of the motor at a constant speed state between 500 kHz and 1 MHz, and thus similar performance is achieved in driving the motor.

In the open type reactor having the bar shaped core in accordance with the present invention, an LRC Coil, Resistor and Capacitor resonance characteristic is obtained by the open type reactor and the power line, and thus a similar characteristic to the conventional closed type reactor is obtained at a high frequency region generating the overvoltage to the motor. In addition, the present invention has a low impedance characteristic at a low frequency region, as compared with the closed type reactor. As a result, the voltage loss is decreased.

Moreover, a size of the core of the conventional closed type reactor is large, and thus a cross sectional area of the core cannot be increased in order to restrict the output voltage. However, a cross sectional area of the open type reactor having the bar shaped core in accordance with the present invention can be increased, if necessary. Thus, an impedance value thereof is decreased, thereby improving a restriction effect of the output voltage.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A control device for an AC motor, the device comprising:

an alternating electric current power source for supplying an alternating current to the motor;

a converter for converting the alternating current supplied from the power source into a direct electric current;

a condenser for smoothing the direct current outputted from the converter;

an inverter for inverting the direct current from the condenser into an alternating current, the inverter having a plurality of power switching devices;

a pulse width modulation signal generator for supplying a control signal to switch the power switching devices;

a controller for controlling a generation of the control signal of the pulse width modulation signal generator; and a reactor provided between the inverter and the motor, and having a bar shaped core, with at least two individual phase coils wound thereon, for minimizing voltage consumption during a starting or accelerating operation of the motor.

2. The control device according to claim 1, wherein the reactor minimizes a voltage drop during the starting or accelerating operation of the motor, and includes three decoupled bar shaped cores, each core corresponding to a phase of a three phase alternating current supplied to the motor.

3. The control device according to claim 1, wherein the reactor comprises:

three decoupled bar shaped cores corresponding to each phase current of the three phase alternating current supplied to the motor; and three coil windings, each winding on each of the three bar shaped cores.

4. The control device according to claim 1, wherein the reactor comprises:

a bar shaped core; and three coil windings on the bar shaped core, each winding corresponding to each phase current of the three phase alternating current.

5. The control device according to claim 1, further comprising a low pass filter disposed in parallel to the motor relative to the reactor for restricting a high frequency voltage applying to the motor more than a predetermined level.

* * * * *